United States Patent [19]

Fuchs et al.

[11] 4,449,297

[45] May 22, 1984

[54] CLIPPING APPARATUS

[76] Inventors: Dorothy J. Fuchs; Francis J. Fuchs, Jr., both of 593 104th Ave., Naples, Fla. 33940

[21] Appl. No.: 431,228

[22] Filed: Sep. 30, 1982

[51] Int. Cl.³ .......................................... A45D 29/00
[52] U.S. Cl. ..................................................... 30/29
[58] Field of Search ........................ 30/29, 26, 27, 233

[56] References Cited

U.S. PATENT DOCUMENTS

| | | | |
|---|---|---|---|
| 3,845,553 | 11/1974 | Fields | 30/29 |
| 3,903,596 | 9/1975 | Crosby | 30/29 |
| 4,228,585 | 10/1980 | Nelson | 30/29 |

FOREIGN PATENT DOCUMENTS 405554  11/1909  France .................................... 30/29

Primary Examiner—Jimmy C. Peters
Attorney, Agent, or Firm—R. Gale Rhodes, Jr.

[57] ABSTRACT

A claw clipper is provided with a pair of cutters having cooperating shearing edges. A first cutter has a concave cylindrically shaped surface the bottom edge of which is generally circular. The second cutter has a U-shaped member with the base portion provided at the center with an upwardly extending post having a flat upper surface. There are safety members on each side of the post at a predetermined distance from the post to prevent a claw inserted there between from being cut so deep as to cut a blood vessel in the inner part of the claw. The shearing edges provide the claw with a smooth contoured surface in the plane of clawing.

1 Claim, 5 Drawing Figures

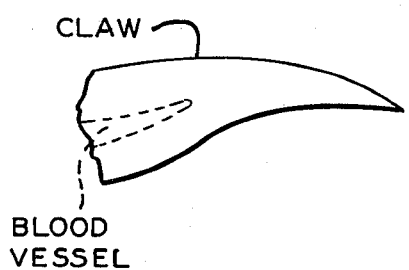
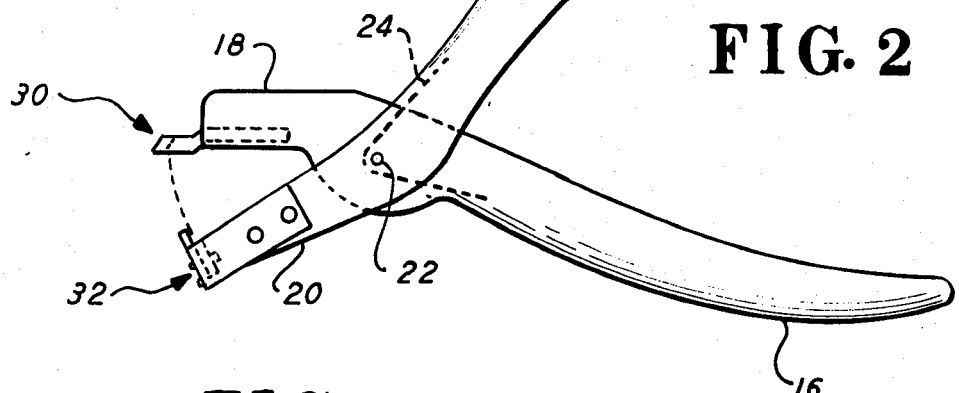
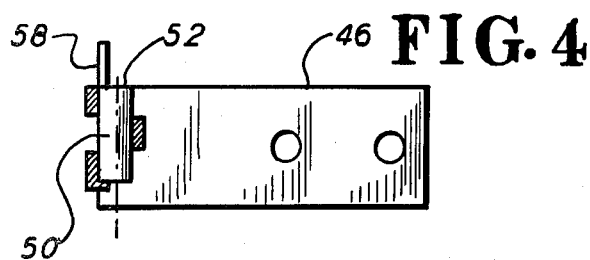
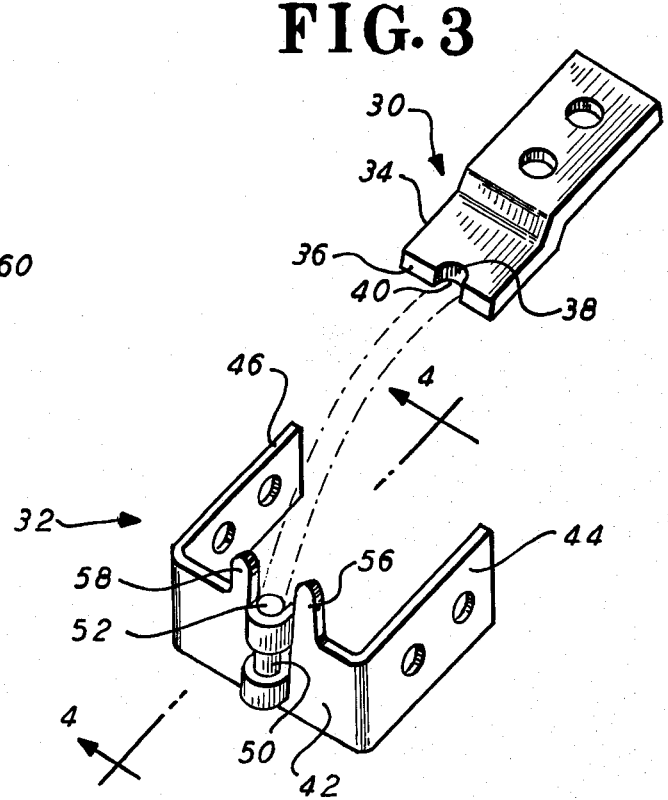
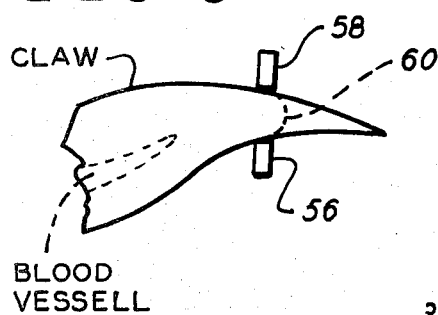

CLIPPING APPARATUS

BACKGROUND OF THE INVENTION

This invention relates generally to clipping apparatus and more particularly to apparatus for clipping a claw, for example of an animal such as a cat or a dog, or a bird.

As is known to those skilled in the art, various apparatus are known for the clipping of animal and bird claws to prevent scratching, attacking of one animal by the other or the attacking of one bird by another, or for the prevention of the destruction of property as is commonly done by cats in a house. Such prior art apparatus suffer, typically, from the problem that the cut provided is a straight cut and hence the cut claw still has relatively sharp edges which can still cause the above-noted problems. In addition, typical prior art clipping apparatus is structured such that in use it obscures at least a portion of the claw being cut causing clipping at unwanted points and even injury to the animal or bird whose claws are being clipped. More significantly with regard to such injuries, as is further known, the claws of some animals, and particularly the claws of birds, include blood vessels sufficiently close to the end of the claw such that upon clipping the blood vessel can be cut or ruptured resulting in unwanted bleeding and in the case of some birds, even bleeding to death.

Accordingly, there exists a need in the clipping apparatus art for clipping apparatus for claws overcoming the above-noted prior art problems.

SUMMARY OF THE INVENTION

The clipping apparatus of the present invention overcomes the above-noted prior art problems and includes the features of providing a rounded or smooth or contoured cut to a claw in the plane of clawing, provides a safety feature to prevent cutting of the claw too deeply so as to cut the blood vessel and further includes the feature of providing a clear view of the clipping operation to facilitate the clipping process at the proper point and in the proper manner.

Such apparatus includes a first cutter provided with a smooth, contoured shearing edge such as a semi-circular edge and a second cutter provided with a smooth, contoured shearing surface such as a circular shearing surface, upon a claw being placed between the shearing edge and the shearing surface and oriented such that the shearing surface is in the plane of clawing, the cutters are operated to engage and shear the claw and provide the claw with a smooth contoured surface in the plane of clawing such as a rounded surface. In addition, the apparatus may include safety structure for preventing the insertion of the claw into the clipping apparatus so far as to cause clipping or shearing of the blood vessel.

DESCRIPTION OF THE DRAWINGS

FIG. 1 is a partial view of a claw illustrating the plane of clawing and showing a blood vessel typically found in a claw;

FIG. 2 is a side or plan view of complete clipping apparatus embodying the present invention;

FIG. 3 is a perspective view showing the details of a pair of cutters embodying and comprising the present invention;

FIG. 4 is a cross-sectional view taken along the lines 4—4 in FIG. 3 in the direction of the arrows; and FIG. 5 is a partial view of a claw illustrating the smooth contoured surface provided to the claw in the plane of clawing and illustrating the operation of the safety means for preventing clipping or severing of a blood vessel found in a claw.

DESCRIPTION OF THE PREFERRED EMBODIMENT

Referring now to FIG. 1, there is shown a partial view of a claw, representative of a typical animal claw such as a cat's claw, or the claw of a bird, and also shown, in dashed outline, is a blood vessel situated in the claw. As known to those familiar with the clawing habits of animals and birds, the claws thereof claw in a plane of clawing with such plane of clawing being the plane of the drawing and with the direction of clawing being illustrated by the curved arrow 10; such claws generally do not claw in any other plane in that such claws typically do not move from side to side but rather move in a single plane, typically vertical if the animal or bird is standing, but with such plane being illustrated in FIG. 1 as being a horizontal plane in the plane of the drawing.

Referring now to FIG. 2, there are shown clipping apparatus indicated by general numerical designation 12 and including a pair of pivotally interconnected plier-like handles 14 and 16 with respectively integrally formed nose portions 18 and 20, the apparatus being pivotally interconnected by the pivot 22 and such apparatus further including, in the manner known to those skilled in the art, a generally V-shaped compression spring 24 which biases the handles 14 and 16 to their open positions shown in FIG. 2 and which upon the handles being forced inwardly is compressed to provide its subsequent biasing action. Referring still to FIG. 2, connected to the nose portions 18 and 20, respectively, are first and second cutters 30 and 32; the cutters being connected to the nose portions by typical suitable means, such as known to those skilled in the art, and such as by screws, welding, etc.

The structures of the first or upper cutter 30 and the second or lower cutter 32 may be seen in better detail by reference to FIG. 3 wherein it will be noted that the upper cutter 30 includes a generally planar member 34 provided with an inclined surface 36 into which is formed an integrally extending, inclined, cylindrically shaped surface 38 the bottom edge of which is generally circular and provides a smooth, contoured shearing edge such as the circular or semi-circular edge 40 shown. The second or lower cutter 32 comprises a generally U-shaped member having a base 42 and a pair of spaced apart, inwardly extending legs 44 and 46; the legs 44 and 46 are spaced apart a predetermined distance sufficient to permit the first or upper cutter 30 to enter therebetween. The base portion 42 is provided at its center with an upwardly extending generally cylindrically shaped post 50, better seen in the cross-sectional view of FIG. 4, having a generally flat circular upper surface 52 providing a smooth, contoured shearing surface such as the circular shearing surface shown. In addition, the U-shaped member comprising the lower cutter 32 is further provided with a pair of upwardly extending safety members 56 and 58 which safety members, as illustrated in FIG. 5, are spaced apart a sufficient distance to permit the claw to be inserted therebetween and over the shearing surface 52 but also spaced apart a distance such that the claws cannot be inserted therebetween a distance sufficient to permit the blood vessel to be cut or severed.

Referring again to FIGS. 3 and 4, it will be understood that the post 50 may be provided on the base member 42 of the lower cutter 32 by shearing the base member in two positions displaced vertically of each other along the central portion of the base member 42 and by bending loops inwardly and outwardly as shown to receive the post 50 in wedged engagement or by having the post welded therein; the post may be secured to the lower cutter 32 by other means within the skill of those known to the metal forming arts.

Referring now to the operation of the clipping apparatus of the present invention, and referring again to FIG. 5, a claw is oriented as shown in FIG. 5 such that the clawing action of the claw is in the plane of the drawing and the claw is inserted between the safety members 56 and 58 to the extent permitted by their spacing but such, as noted above, to preclude the claw from being inserted a distance sufficient to cause the blood vessel to be severed. The handles 14 and 16 of FIG. 2 are then forced towards each other, such as by manual operation, to cause the nose members 18 and 19 of FIG. 2 to be advanced towards each other in an arcuate path whereby the upper cutter 30 and the lower cutter 32 are also advanced towards each other in the arcuate path, the arcuate path being indicated by the dashed lines in FIG. 3 between the shearing edge 40 and the shearing surface 52. Thus, the shearing edge 40 and the shearing surface 52 are advanced towards and into engagement with each other thereby shearing the claw (FIG. 5) therebetween and with the circular or semi-circular shearing edge 40 and the circular shearing surface 52 shearing the claw, such as shown in FIG. 5, to provide the claw with the rounded edge in the plane of clawing as illustrated by the dashed line 60 in FIG. 5. It will be noted, as illustrated in FIG. 5 and as may be observed from FIG. 3, that the claw during clipping is substantially visible whereby the clipping operation is not obscured by the structure of the clipping apparatus, the blood vessel of the claw is not clipped to cause bleeding, and the claw most importantly is provided with a smooth, contoured surface in the plane of clawing such as the rounded edge 60 shown in dashed outline in FIG. 5.

It will be further understood by those skilled in the art that many variations and modifications of the present invention may be made without departing from the spirit and the scope thereof.

What is claimed is:

1. Clipping apparatus for clipping a claw and for providing said claw with a smooth contoured surface in the plane of clawing, comprising:

a first cutter provided with a smooth, contoured shearing edge, said first cutter including a generally planar member having a front edge provided with an inclined surface into which is formed an inwardly extending cylindrically shaped surface the bottom edge of which is generally circular;

a second cutter provided with a smooth, contoured shearing surface complementary in configuration to said shearing edge, said second cutter including a generally U-shaped member having a base and legs, the legs extend inwardly and are spaced apart a predetermined distance to permit said first cutter to enter therebetween, the base portion of said U-shaped member provided at its center with an upwardly extending generally cylindrically shaped post having a generally flat circular upper surface;

said U-shaped member provided with a pair of upwardly extending safety membes on either side of said post, said safety members spaced from said post a predetermined distance to prevent said claw from being inserted therebetween a distance sufficient to cause said blood vessel to be sheared upon said clipping; and upon said claw being placed between said shearing edge and said shearing surface and oriented such that the shearing surface is in said plane of clawing and upon said shearing edge being advanced towards and into engagement with said shearing surface, said shearing edge and said shearing surface cooperate to shear and clip said claw and provide said claw with said smooth contoured surface in said plane of clawing.

* * * * *